United States Patent Office 3,491,066
Patented Jan. 20, 1970

3,491,066
PROCESS FOR PREPARING A LINEAR POLYESTER RESIN HAVING PENDANT ALCOHOLIC HYDROXY GROUPS
John Christos Petropoulos, Norwalk, Conn., assignor to American Cyanamid Company, Stamford, Conn., a corporation of Maine
No Drawing. Filed July 10, 1967, Ser. No. 652,021
Int. Cl. C08g *17/06, 17/14*
U.S. Cl. 260—75
10 Claims

ABSTRACT OF THE DISCLOSURE

A process for preparing a linear polyester resin having pendant alcoholic hydroxy groups comprising esterifying a dicarboxylic acid with a 2,2-methylol alkanoic acid having from 5 to 8 carbon atoms, inclusive, to form a linear polyester resin having pendant carboxyl groups wherein said pendant carboxyl groups are converted to pendant alcoholic hydroxy groups by reacting the same with an alkylene oxide or an alkylene carbonate.

BACKGROUND OF THE INVENTION

Linear polyester resin compositions having pendant carboxyl groups do not provide the necessary cross-linking sites for use with certain cross-linking reactants such as the hexakismethoxymethyl melamine at relatively low curing or stoving temperatures, whereas linear polyester resins containing pendant alcoholic hydroxy groups do provide such cross-linking sites for such cross-linking agents. When these linear polyester resins having the pendant alcoholic hydroxy groups are used with a cross-linking agent and the mixture converted to a cross-linked structure as a coating composition, and as a coated film the properties of the ultimate film are significantly enhanced by providing improved mar-resistance and enhanced weatherability.

FIELD OF THE INVENTION

The concept of the present invention provides a process for preparing a component to be used in a surface coating composition for application on metals such as sheet steel, aluminum plate, or on wood, glass, paper, and the like. The linear polyester resins having the pendant alcoholic hydroxy groups produced by the process of the present invention are combined with relatively small quantities of a cross-linking agent and when subjected to ambient temperatures or to conventional bake cycles, the ultimate film produced on the substrate in a cross-linked state is mar-resistant, scratch-resistant and weather-resistant, among a plurality of other desirable properties. The use of dimethylol alkanoic acid which has a hindered tertiary carboxyl group and, therefore, does not undergo any appreciable esterification in comparison with unhindered carboxyl groups permits the preparation of linear polymers having pendant carboxyl groups which serve as potential cross-linking sites. In this fashion, polymers having controlled cross-linked density can be readily prepared.

DESCRIPTION OF THE PRIOR ART

Since one of the illustratively essential reactants used in the practice of the process of the present invention is dimethylol propionic acid, the instant applicant is aware of a brochure published by the Trojan Powder Company of Allentown, Pennsylvania, offering for sale the dimethylol propionic acid and suggests its use in water solvent resins and other compounds. This is the closest prior art of which the instant applicant is aware, although there is a caveat on the brochure that indicates that United States and foreign process and use patents have been applied for.

SUMMARY OF THE INVENTION

This invention relates to a process comprising esterifying (A) a dicarboxylic acid with (B) a 2,2-dimethylol alkanoic acid having from 53 to 8 carbon atoms, inclusive, to form a linear polyester resin having pendant carboxyl groups, reacting at least some of said pendant carboxyl groups with (C) a compound selected from the group consisting of an alkylene oxide and an alkylene carbonate wherein the amount of (C) used is sufficient on a stoichiometrically calculated basis to provide an end product having an acid number below about 80. Still further, this invention relates to the composition produced according to the process of the present invention. Still further, this invention relates to a coating composition containing as an essential ingredient the product produced by the process of the present invention, blended with a cross-linking agent.

One of the objects of the present invention is to produce a linear polyester resin having pendant carboxyl groups wherein one of the essential reactants in the process is 2,2-dimethylol alkanoic acid having from 5 to 8 carbon atoms, inclusive, wherein said pendant carboxyl groups are then converted by reaction with either an alkylene oxide or an alkylene carbonate to a linear polyester resin having pendant alcoholic hydroxy groups which resin may then be blended with a cross-linking agent such as hexakismethoxymethyl melamine or with diisocyanates or triisocyanates to provide a coating composition which when applied and baked on a substrate provides a surface film with markedly enhanced properties. These and other objects of the present invention will be discussed in greater detail hereinbelow.

In practicing the process of the present invention, one may use any dicarboxylic acid including the α,β-ethylenically unsaturated dicarboxylic acide and/or those dicarboxylic acids free of non-benzenoid unsaturation. Among the dicarboxylic acids free of non-benzenoid unsaturation which may be used in the practice of the present invention are the phthalic acids such as ortho, iso and terephthalic acids as well as the halogen-substituted phthalic acids such as tetrachlorophthalic anhydride, oxalic acid, malonic acid, succinic acid, gultaric acid, sebacic acid, adipic acid, pimelic acid, suberic acid, azelaic acid, tartaric acid, malic acid, and the like. Among the α,β-ethylenically unsaturated dicarboxylic acids which may be used in the practice of the process of the present invention are maleic acid, fumaric acid, itaconic acid, citraconic acid, cloromaleic acid, chlorofumaric acid and the like. Whenever available, the anhydrides of these acids may be used. These acids and/or their anhydrides may be used either singly or in combination with one another.

The second essential reactant used in the practice of the process of the present invention is 2,2-dimethylol alkanoic acid having from 5 to 8 carbon atoms, inclusive, which are sometimes referred to hereinbelow as DMAA generically and DMPA specifically for the sake of brevity and simplicity. This class of alkanoic acids may be represented by the structural formula.

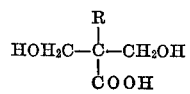

wherein R is an alkyl group containing from 1 to 4 carbon atoms. Other specific 2,2-dimethylol alkanoic acids which may be used in the practice of the process of the present invention are 2,2-dimethylol butyric acid, 2,2- dimethylol valeric acid, and 2,2-caproic acid. This compound when used in the practice of the process of the present invention functions as a glycol and produces a linear polyester resin when esterified with the selected dicarboxylic acid to produce a linear chain from which there is pendant a plurality of carboxyl groups. In reacting the dimethylol alkanoic acid with the dicarboxylic acid, no other glycol compound need be used, but if desired, certain quantities of a glycol different from the dimethylol alkanoic acid may be used in an amount not exceeding about 85 mole percent based on the total moles of glycol compounds used. Preferably, one would use between about 50 mole percent and 75 mole percent of the dimethylol alkanoic acid and, correspondingly, between about 50 mole percent and 25 mole percent of a glycol different from dimethylol alkanoic acid wherein said mole percentages are based on the total moles of glycol compounds used. Among the dihydric alcohols which may be used with the DMAA are ethylene glycol, propylene glycol, butanediol-1,3, butanediol-1,4, diethylene glycol, dipropylene glycol, trimethylene glycol, tetramethylene glycol, pentanediol-1,3, pentanediol-1,4, pentanediol-1,5, neopentyl glycol, and the like. These glycols that are different from the DMAA and the like may be used either singly or in combination with one another when used with the DMAA and the like as the glycol component in the esterification of dicarboxylic acid. The total amount of the glycol component used to esterify the dicarboxylic acid may be determined on a strictly stoichiometrical basis as being that amount required to esterify all of the carboxyl groups of the dicarboxylic acid so as to produce a substantially fully esterified linear polyester wherein the pendant carboxyl groups remain unesterified. It is preferred to use an excess of the glycol component whether it be DMAA and the like alone or DMAA and the like in combination with a glycol different from DMAA and the like. This excess should be in the range of about 5 to about 20%, by weight, calculated on a stoichiometric basis in excess of that amount required to fully esterify the dicarboxylic acid.

When the first step of the process of the present invention has been accomplished, and the linear polyester resin with the pendant carboxyl groups has been produced, one then reacts said polyester resin with a compound selected from the group consisting of an alkylene oxide and an alkylene carbonate in an amount sufficient, on a stoichiometrically calculated basis, to provide an end product having an acid number below about 80, and for water-resistant and weather-resistant properties having an acid number below 50 and for optimal properties for outdoor use as a film, an acid number of less than 20. Among the alkylene oxides that may be used in the practice of the process of the present invention are ethylene oxide, propylene oxide, butylene oxide, and the like. Among the alkylene carbonates which may be used to convert the pendant carboxyl groups to pendant alcoholic hydroxy groups are ethylene carbonate, propylene carbonate, butylene carbonate, and the like.

The products produced according to the process of the present invention will be used in a coating composition in which a cross-linking agent such as hexakismethoxymethyl melamine is present. This cross-linking agent is well known in the art and its preparation is shown in the U.S. Patents 2,918,452, 2,998,410 and 2,998,411. These patents are incorporated herein by reference.

The amount of the cross-linking agent used in the ultimate coating composition utilizing the product produced by the process of the present invention may be varied between about 5% and 40%, by weight, calculated on a stoichiometrical basis to be sufficient to cross-link the pendant alcoholic hydroxy groups. It is not imperative that all of the pendant alcoholic hydroxy groups be cross-linked, although, if desired, they could be, but at least some cross-linking must be achieved in order to experience the enhanced properties of a mar-resistant, weather-resistant film which the use of the product of the present process provides.

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the case except as is indicated in the appended claims.

EXAMPLE 1

Into a suitable reaction vessel equipped with thermometer, stirrer, Dean-Stark trap with reflux condenser attached, there is added 876 parts (6 moles) of adipic acid, 804 parts of dimethylol propionic acid (6 moles) and 84 parts of xylene. The temperature is raised gradually until the reactants begin to liquify. Mixing is accomplished by hand until these reactants are sufficiently liquified so that mechanical stirring is possible. This takes approximately 1½ hours after the heat is applied to liquify all the monomers and collect the first water of reaction in the trap. At this point, the temperature is about 138° C. The temperature is gradually raised to about 185° C. over the next 5½ hours and 191 parts of water are collected. The batch is cooled to 150° C. whereupon 541 parts of a 25/75 mixture of xylene and butanol, respectively, is added. The resulting resin had a solids content of 71.5%, by weight, and a viscosity of $Z_2$–$Z_3$ on the Gardner-Holdt scale at 25° C. and an acid number of 282. 500 parts of the resin thus produced and 1.8 grams of lithium ricinoleate are introduced into a suitable reaction vessel equipped with stirrer, thermometer, gas inlet and outlet tubes wherein the inlet tube is below the level of the resin solution and a Dry Ice condenser. As the mixture is being heated, ethylene oxide is bubbled in slowly. The temperature is maintained between about 80° C. and 120° C. for about 16 hours while the ethylene oxide is continuously being bubbled in during which time the acid number of the resin drops to about 60. 70 parts (solids) of the thus produced hydroxy ethylated polyester resin are blended with 30 parts of hexamethoxymethyl melamine and 1% of phosphorus trichloride. The film is cast on a sheet of aluminum and the coating is cured at ambient temperature to produce a hard, mar-resistant film.

EXAMPLE 2

Into a suitable reaction vessel equipped as in the first part of Example 1 there is introduced 876 parts (6 moles) of adipic acid, 724 parts (5.4 moles) of DMPA, 62.5 parts (0.6 mole) of neopentyl glycol and 83 parts of xylene. The temperature is raised gradually as in Example 1 with mechanical stirring until the temperature reaches 138° C. The temperature is gradually raised to 150° C. over the next 10 hour period and 193 parts of water of reaction are collected in the trap. The resin is discharged from the reaction vessel without further thinning. It is a very viscous liquid with a solids content of 90.6% and an acid number of 187.

318 parts of the resin thus prepared are blended with 89 parts of xylene, 95 parts of butanol and 0.23 part of triethanolamine in a reaction vessel equipped with a stirrer, thermometer, gas inlet tube terminating below the level of the resin, gas outlet tube and a Dry Ice condenser. The mix is heated to a temperature between about 80° C. and 114° C. while ethylene oxide is bubbled slowly therethrough. The addition is continued for about 7½ hours. At the end of this period, the acid number has dropped to about 22.

70 parts of the resin thus produced (solids) are blended with 30 parts of hexamethoxymethylmelamine and 1 part of phosphorus trichloride. A film was drawn on a steel plate and cured at ambient temperature to a hard, mar-resistant film.

EXAMPLE 3

Into a suitable reaction vessel equipped as in the first part of Example 1 there is introduced 584 parts (4 moles) of adipic acid, 589.6 parts (4.4 moles) of DMPA and 117 parts of xylene. The temperature is raised gradually and when the temperature reaches 128° C. all of the reactants have become liquid and the first water of reaction is collected in the trap. The reaction is continued for 6⅔ hours with the temperature gradually raising to 145° C. At the end of this period, 110 parts of water is collected and the resulting resin has an acid number of 294.

500 parts of the resin thus produced are blended with 0.45 part of potassium carbonate and are introduced into a suitable reaction vessel equipped with a stirrer, thermometer and water condenser. The mix is heated to about 95° C. and the potassium carbonate is thoroughly dispersed within the resin. Thereupon, 208 parts of ethylene carbonate are added. The temperature is raised to a gentle reflux and maintained between about 147° C. and 162° C. for about 16½ hours during which time the acid number drops to about 34.

A coating composition is prepared by blending 50 parts of the resin thus produced with 18 parts of hexamethoxymethylmelamine and 0.6 part of paratoluene sulfonic acid and thinned to about 50% solids using a mixture of xylene and butanol. When sprayed onto a glass surface and cured for 15 minutes at 200° F. a hard, mar-resistant film results which has excellent adhesion to the substrate.

EXAMPLE 4

Into a suitable reaction vessel equipped as in the first part of Example 1 there is introduced 132.8 parts of isophthalic acid, 187.2 parts of neopentyl glycol (2,2-dimethyl-1,3-propanediol), 10.6 parts of a 2% solution of stannous chloride dissolved in ethylene glycol and 60 parts of xylene. The temperature is raised to about 155° C. and held until a clear solution is obtained free of any particulate matter. During this time, about 48 parts of water are collected in the trap. The reactants are cooled to about 100° C. and 402 parts of dimethylol propionic acid and 467.2 parts of adipic acid are added to the reaction vessel. The temperature is again raised to about 155° C. and the water of reaction is collected in the trap. When about 165 parts of water is collected, the contents of the reaction vessel are cooled to about 100° C. and 209 parts of ethylene carbonate, 0.9 part of potassium carbonate and 60 parts of butanol are added. The temperature is raised to about 160° C. and held there until the acid number of the resin is lowered to 22. The resin is cooled to 140° C. and thinned to about 70% total solids using 165 parts of xylene and 165 parts of butanol. The resulting resin has a viscosity of X–Y on the Gardner-Holdt scale at 25° C., a color of 1 (Gardner 1933 scale) and an acid number of 20.

A varnish is prepared by mixing 100 parts of the above resin (solids) with 30 parts of hexamethoxymethyl melamine, 0.5 part of paratoluene sulfonic acid. The solids of the varnish are cut by diluting with a 50/50 blend of xylene and butanol. A film of this varnish is applied to a suitable substrate and cured in an oven at a temperature of 150° C. for about 15 minutes and the resulting coating is tough and mar-resistant.

EXAMPLE 5

Into a suitable reaction vessel equipped as in the first part of Example 1 there is introduced 752 parts of azelaic acid, 402 parts of dimethylol propionic acid, 187.2 parts of 2,2-dimethyl-1,3-propanediol and 67 parts of xylene. The reaction charge is gradually heated to about 150° C. at which time water began collecting in the trap. The reaction is allowed to continue for 4 hours during which time the temperature rose to 178° C. A total of 130 parts of water is removed and the acid number of the resin is 159. The temperature of the charge is reduced to 100° C. and 255 parts of ethylene carbonate, 1.2 parts of potassium carbonate and 67 parts of butanol are added to the reaction vessel. The temperature is again raised to reflux (between about 167–184° C.) and the reaction continued for another 4 hours. At the end of this period, a total of 150 parts of water has been removed and the acid number reduced to 32. The resin is cooled and thinned to about 70% solids using 215 parts of xylene and 215 parts of butanol. The resulting resin solution has a viscosity of P–Q at 25° C. on the Gardner-Holdt scale.

EXAMPLE 6

The process according to Example 3 is repeated in all essential details except that there was used as reactants 1 mole of adipic acid, 1 mole of neopentyl glycol and 0.2 mole of dimethylol propionic acid. The reaction temperature was varied between about 130–180° C. with xylene as the azeotrope for about 4 hours. When about 90% of the theoretical amount of water of the reaction had been collected, 0.4 mole of ethylene carbonate and 0.22 part of potassium carbonate were added. The reaction is continued until a final acid number of 17 is obtained. The resin is thinned to a total solids of 70%, by weight, using a 50/50 mixture of xylene and butanol. Again, a 70/30 blend of the resin thus produced and hexamethoxymethyl melamine is prepared, a film drawn down and baked, which film was tough and mar-resistant.

EXAMPLE 7

Example 1 is repeated in all essential details except that the reactants were as follows: 133 parts of isophthalic acid, 187.2 parts of neopentyl glycol, 60 parts of xylene and 10.6 parts of a 2% solution of stannous chloride in ethylene glycol are used. After heating the mixture to 160° C. and held there for about 4 hours, the solution becomes clear. To this solution there is added 402 parts of dimethylol propionic acid and 467.2 parts of adipic acid. The reaction is continued at about 160° C. for about 7 hours. A total of 178 parts of water is removed. The acid number is about 48. There is then added 209 parts of ethylene carbonate, 60 parts of butanol and 0.9 part of potassium carbonate. The reaction is continued at a temperature between about 137° C. and 178° C. for another five hours. The acid number of the final resin is 78. 100 parts of the resin thus produced were mixed with 15 parts of 2-amino-2-methyl propanol-1, 48.5 parts of hexamethoxymethyl melamine and 100 parts of water. Upon mixing, a clear solution resulted. A film of this mixture when cast on glass was cured to a hard, clear, mar-resistant coating.

EXAMPLE 8

Into a suitable reaction vessel equipped as in the first part of Example 1 there is introduced 808 parts of sebacic acid, 187.2 parts of neopentyl glycol (2,2-dimethyl-1,3-propanediol), 402 parts of dimethylol propionic acid and 70 parts of xylene. The reaction charge is gradually heated to about 145° C. at which time water began collecting in the trap. The reaction is allowed to continue for about 5 hours during which time the temperature rose to 160° C. A total of 130 parts of water is removed and the acid number of the resin is 139. The temperature of the charge is reduced to 100° C. and 226 parts of ethylene carbonate, 1.2 parts of potassium carbonate and 70 parts of butanol are added to the reaction vessel. The temperature is again raised to reflux (between 160–188° C.) and the reaction continued for another 4 hours. At the end of this period, a total of 154 parts of water had been removed and the acid number reduced to 33. The resin is cooled and thinned to about 70% solids using 171 parts of xylene and 171 parts of butanol. The resulting resin solution had a viscosity of W–X at 25° C. on the Gardner-Holdt scale. Again, a 70/30 blend of the resin thus produced and hexamethoxymethyl melamine is prepared, a film drawn down and baked, which film was tough and mar-resistant.

EXAMPLE 9

Into a suitable reaction vessel equipped as in the first part of Example 1 there is introduced 467.2 parts of adipic acid, 92.8 parts of fumaric acid, 182.2 parts of neopentyl glycol (2,2-dimethyl-1,3-propanediol), 402 parts of dimethylol propionic acid and 57 parts of xylene. The reaction charge is gradually heated to about 131° C. at which time water began collecting in the trap. The reaction is allowed to continue for about 5 hours during which time the temperature rose to 170° C. A total of 130 parts of water is removed and the acid number of the resin is 190. The temperature of the charge is reduced to 100° C. and 271.7 parts of ethylene carbonate, 0.9 part of potassium carbonate and 57 parts of butanol are added to the reaction vessel. The temperature is again raised to reflux (between 170–180° C.) and the reaction continued for another 5 hours. At the end of this period, a total of 153 parts of water had been removed and the acid number reduced to 23. The resin is cooled and thinned to about 70% solids using 187 parts of xylene and 187 parts of butanol. The resulting resin solution had a viscosity of X–Y at 25° C. on the Gardner-Holdt scale. Again, a 70/30 blend of the resin thus produced and hexamethoxymethyl melamine is prepared, a film drawn down and baked, which film was tough and mar-resistant.

EXAMPLE 10

Example 9 is repeated in all essential details except that the reactants were as follows: 584 parts of adipic acid, 136.8 parts of propylene glycol, 402 parts of dimethylol propionic acid and 56 parts of xylene. The reaction charge is gradually heated to about 142° C. at which time water began collecting in the trap. The reaction is allowed to continue for about 4 hours during which time the temperature rose to 164° C. A total of 130 parts of water is removed and the acid number of the resin is 220. The temperature of the charge is reduced to 100° C. and 377 parts of ethylene carbonate, 0.9 part of potassium carbonate and 56 parts of butanol are added to the reaction vessel. The temperature is again raised to reflux (157–175° C.) and the reaction continued for another 4 hours. At the end of this period, a total of 160 parts of water had been removed and the acid number reduced to 22. The resin is cooled and thinned to about 70% solids using 191 parts of xylene and 191 parts of butanol. A 70/30 blend of the resin thus produced and hexamethoxymethyl melamine is prepared, a film drawn down and baked, which film was tough and mar-resistant.

EXAMPLE 11

Example 9 is repeated in all essential details except that the reactants were as follows: 118.4 parts of phthalic anhydride, 467.2 parts of adipic acid, 187.2 parts of neopentyl glycol, 402 parts of dimethylol propionic acid and 59 parts of xylene. The reaction charge is gradually heated to about 142° C. at which time water began collecting in the trap. The reaction is allowed to continue for about 7 hours during which time the temperature rose to 179° C. A total of 118 parts of water is removed and the acid number of the resin is 190. The temperature of the charge is reduced to 100° C. and 282 parts of ethylene carbonate, 0.9 part of potassium carbonate and 59 parts of butanol are added to the reaction vessel. The temperature is again raised to reflux (173–181° C.) and the reaction continued for another 5 hours. At the end of this period, a total of 140 parts of water had been removed and the acid number reduced to 19. The resin is cooled and thinned to about 70% solids using 193 parts of xylene and 193 parts of butanol. A 70/30 blend of the resin thus produced and hexamethoxymethyl melamine is prepared, a film drawn down and baked, which film was tough and mar-resistant.

EXAMPLE 12

Example 2 is repeated in all essential details except that in the place of the dimethylol propionic acid there is used an equivalent amount of 2,2-dimethylol butyric acid. Comparable mar-resistant films were achieved.

EXAMPLE 13

Example 3 is repeated in all essential details except that in the place of the dimethylol propionic acid there is substituted an equivalent amount of 2,2-dimethylol valeric acid. Films were drawn down on a steel plate and cured at ambient temperatures to hard, mar-resistant films.

EXAMPLE 14

Example 1 is repeated in all essential details except that in the place of the dimethylol propionic acid there is substituted an equivalent amount of 2,2-dimethylol caproic acid. A film is cast on a sheet of aluminum and the coating is cured at ambient temperatures to produce a hard, mar-resistant film.

The 2,2-dimethylol alkanoic acids are prepared by selecting the appropriate corresponding aldehyde such as butyraldehyde or propionaldehyde and the like, which aldehyde is then reacted with formaldehyde on the α-carbon in an aldol reaction to produce the corresponding 2,2-dimethylol aldehyde such as 2,2-dimethylol propionaldehyde or the 2,2-dimethylol butyraldehyde, which substituted aldehyde is then oxidized under mild conditions to form the corresponding 2,2-dimethylol alkanoic acid such as the 2,2-dimethylol propionic acid, 2,2-dimethylol butyric acid (DMBA), 2,2-dimethylol valeric acid (DMVA), and 2,2-dimethylol caproic acid (DMCA).

I claim:

1. A process comprising esterifying (A) a dicarboxylic acid with, as the glycol component, (B) a 2,2-dimethylol alkanoic acid having from 5 to 8 carbon atoms to form a linear polyester resin having pendant carboxyl groups, reacting at least some of said pendant carboxyl groups with (C) a compound selected from the group consisting of ethylene oxide, propylene oxide, butylene oxide, ethylene carbonate, propylene carbonate and butylene carbonate, wherein the amount of (C) used is sufficient, on a stoichiometrically calculated basis, to provide an end product having an acid number below about 80 wherein said glycol component used is present in an amount varying between that amount stoichiometrically calculated to esterify all of the carboxyl groups of said dicarboxylic acid and 20% in excess of that amount stoichiometrically calculated to esterify all of the carboxyl groups of said dicarboxylic acid.

2. The process according to claim 1 in which said 2,2-dimethylol alkanoic acid is 2,2-bis-hydroxymethyl propionic acid and in which a different glycol is used with said propionic acid in an amount not exceeding about 85 mole percent based on the total moles of glycol compounds used.

3. The process according to claim 2 in which there is used between about 50 mol percent and 75 mol percent of 2,2-bishydroxymethyl propionic acid and correspondingly between about 50 mol percent and 25 mol percent of a different glycol.

4. The process according to claim 1 in which (C) is ethylene oxide.

5. The process according to claim 1 in which (C) is ethylene carbonate.

6. The process according to claim 5 in which the dicarboxylic acid is adipic acid.

7. The process according to claim 6 in which the dicarboxylic acid is isophthalic acid.

8. The process according to claim 6 in which the dicarboxylic acid is azelaic acid.

9. The process according to claim 1 in which the 2,2-dimethylol alkanoic acid is 2,2-dimethylol propionic acid.

10. The product produced according to the process of claim 1.

References Cited

UNITED STATES PATENTS

| | | | |
|---|---|---|---|
| 2,863,854 | 12/1958 | Wilson | 260—75 |
| 3,345,313 | 10/1967 | Ruhf et al. | 260—22 |
| 3,366,706 | 1/1968 | Vasta | 260—834 |

FOREIGN PATENTS

| | | |
|---|---|---|
| 896,711 | 5/1962 | Great Britain. |
| 1,325,123 | 3/1963 | France. |

WILLIAM H. SHORT, Primary Examiner

M. GOLDSTEIN, Assistant Examiner

U.S. Cl. X.R.

117—124, 132, 148, 155; 260—33.4, 33.6